Sept. 8, 1970 E. C. HUNGATE 3,527,030
ELIMINATOR STRUCTURE
Filed Sept. 19, 1967 2 Sheets-Sheet 1

INVENTOR.
ERNEST C. HUNGATE
BY
ATTORNEY

Sept. 8, 1970     E. C. HUNGATE     3,527,030
ELIMINATOR STRUCTURE

Filed Sept. 19, 1967     2 Sheets-Sheet 2

INVENTOR.
ERNEST C. HUNGATE
BY
ATTORNEY

United States Patent Office 3,527,030
Patented Sept. 8, 1970

3,527,030
ELIMINATOR STRUCTURE
Ernest C. Hungate, Rte. 5, Box 88,
Greensboro, N.C. 27402
Filed Sept. 19, 1967, Ser. No. 668,865
Int. Cl. B01d 45/08
U.S. Cl. 55—440                    12 Claims

ABSTRACT OF THE DISCLOSURE

An apparatus for treating a gas with a liquid and more specifically to air washers wherein air is treated with water. In systems of this type the gas stream is passed through a housing into direct contact with liquid by discharging the liquid into the gas stream as it passes through the housing. The present invention is directed to eliminator structure for removing liquid particles from the gas stream by passing liquid and gas streams through a plurality of passages so that the liquid and gas streams impinge on the walls of these passages, at least one of the walls including a substantially vertically disposed longitudinal groove which groove includes an offset portion and fluid stream reversal means so that liquid which impinges upon the wall member upstream from the groove passes into the groove as do portions of the gas stream. The fluid reversal means changes the direction of one or both of the fluid streams so that the direction of liquid stream and of the gas stream are in substantially confronting arrangement so that the directional components of the gas and liquid streams are substantially nullified permitting the liquid to flow in a substantially vertical direction down the groove.

BACKGROUND OF THE INVENTION

Heretofore apparatus for treating gas streams with a liquid, especially air conditioning devices such as air washers which are used in industrial appliances, have been severely restricted in their operating velocities due to the configuration of the eliminating structures in these devices. These eliminating structures are intended to remove from the leaving gas stream entrained liquid particles which are normally carried by the gas stream due to its substantial velocity. These eliminators usually consist of a plurality of stationary blades having a generally saw tooth cross-section so that there is defined a plurality of zigzag paths. These zigzag paths are defined by wall members upon which entrained liquid impinges and the wall members are expected to act as collecting surfaces for the liquid so that the leaving gas stream is substantially free of entrained particles of liquid.

Generally these eliminators have been found to be effective up to predetermined velocities at which point the droplets in the gas stream tend to remain in the gas stream because the desired impinging action is not fully effective. Many reasons are attributed to this ineffectiveness at high velocities, for example splattering of liquid may occur on the impinging surfaces so that liquid is reintroduced into the gas stream after encountering a confronting surface. In other applications the high velocity of the gas stream may result in the generation of low pressure areas which will act to pull liquid from the impinging surfaces into the spaces which define the zigzag passages. Also the velocity components of the air stream will directly carry the liquid over the blade surfaces and through the eliminator structure without the expected arresting action of the impingement action.

SUMMARY OF THE INVENTION

In one embodiment of the present invention an eliminator is provided for removing particles of liquid from a gas stream. This eliminator includes means defining passage for the gas stream having a plurality of wall members upon which the gas stream is to impinge being located in said passage, at least one of said wall members comprising a first planar impingement surface and a second planar impingement surface separated therefrom by a longitudinal substantially vertically extending groove, said groove including an offset portion and fluid stream reversal means so that the direction of the gas and the direction of flow of the liquid removed from the gas stream are substantially in confronting arrangement so that the directional components of the gas and liquid in the groove are substantially nullified permitting the liquid to flow in a substantially vertical direction down the groove.

BRIEF DESCRIPTION OF THE DRAWINGS

The attached drawings illustrate a preferred embodiment of the invention in which.

DESCRIPTION OF THE PREFERRED EMBODIMENT

Figure 1:
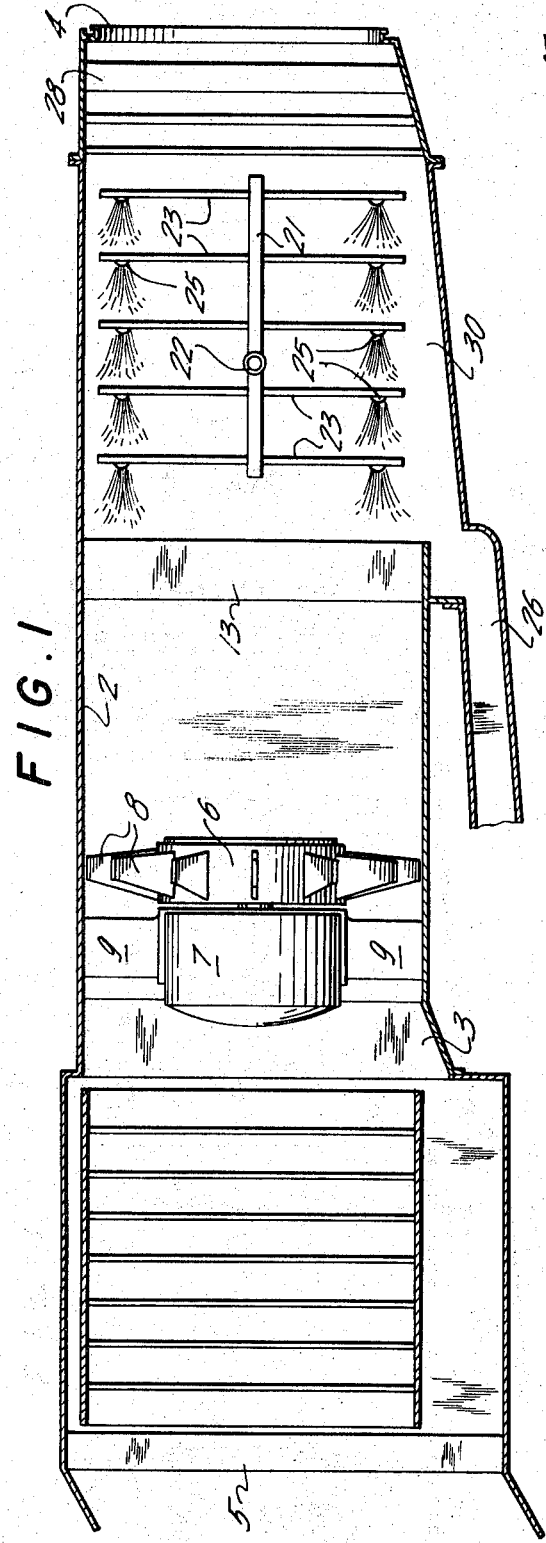
FIG. 1 is a sectional view in elevation of an apparatus employing the invention.

Referring to the drawings, there is shown in FIG. 1 apparatus employed in the present invention for treating a gas stream with a liquid. Specifically, in the preferred embodiment of the apparatus is an air washer wherein the gas stream is air and the liquid is water. An air washer usually includes a housing 2 having an inlet 3 and an outlet 4. The inlet 3 and the outlet 4 are connected by a passage defined by the housing. The inlet as is customary in a textile mill which uses an air washer is connected to a mixing chamber 5. Usually this mixing chamber 5 has adjusting means therein for the purpose of regulating the amount of outside and return air which is to be introduced into the air washer.

Located downstream from the inlet 3 of the air washer is a suitable air moving means such as a fan 6 which is driven by a fan motor 7. The fan 6 includes a plurality of radially extending blades 8. It will be appreciated that other fan means may be utilized to practice the invention. In this particular embodiment the fan 6 is mounted in the passage of the air washer by means of struts.

Downstream from fan 6 may be located a suitable filter 13. While this filter may take a variety of different shapes and structures it is preferred that the filter be of the type disclosed in my copending application Ser. No. 465,579, filed June 21, 1965, now U.S. Pat. No. 3,444,670 entitled "Apparatus for Treating Gas."

Immediately adjacent the filter and located downstream therefrom is a spray chamber which includes an axially extending header 21 connected by means of a supply line 22 to a source of liquid. In an air washer this liquid may be water having a predetermined temperature. Radial arms 23 extend from the header 21, these arms having suitable spray nozzles 25 at the ends thereof whose function is to spray liquid particles into the gas stream to treat the gas or air passing therethrough. Liquid which does not enter the gas stream is collected in sump 30 and passed therefrom through drains 26.

Downstream of said spray chamber in the air washer is located an eliminator structure 28 whose function is to effectively remove particles of liquid or water from the gas stream being discharged from the apparatus.

Figure 4:
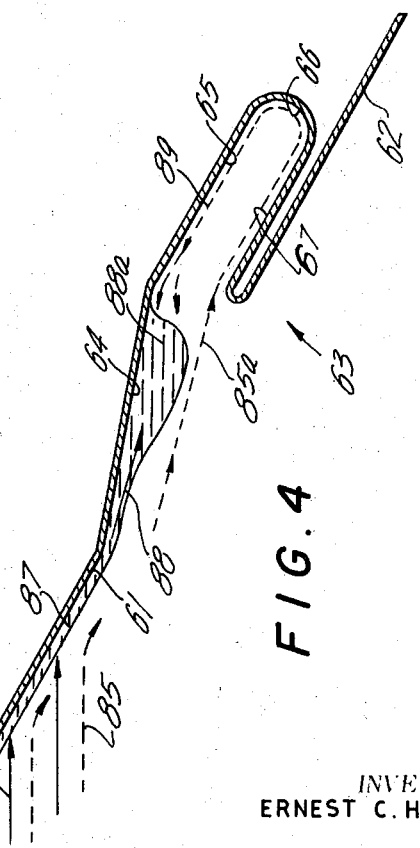
FIG. 4 is an enlarged fragmentary view of the portion of the eliminator structure showing the first groove in FIG. 2.
Figures 2, 3:
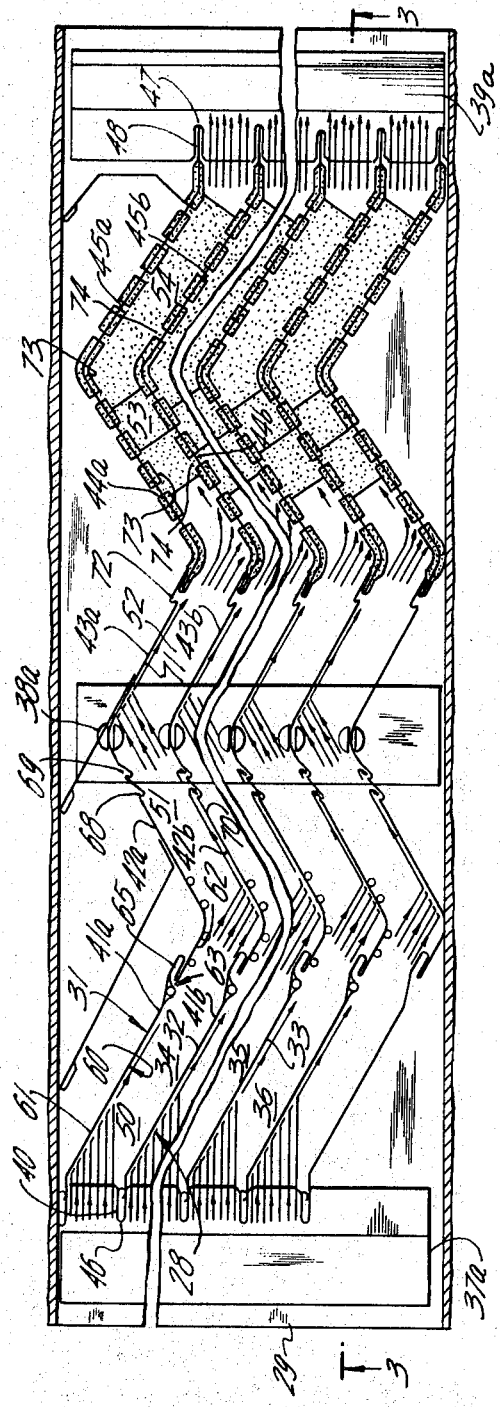
FIG. 2 is an enlarged horizontal sectional view of the eliminator.
FIG. 3 is a plan view of an eliminator construction shown in FIG. 2 taken along the lines 3—3.

Referring now to FIGS. 2, 3 and 4, there is disclosed therein the aspects of the eliminator to which the present invention is directed. Eliminator 28 (FIG. 1) is located in the exit passage 29 of the air washer. FIG. 2 is an enlarged sectional view taken in plan of the structure which comprises the eliminator. This eliminator structure includes a plurality of parallel saw tooth, thin wall members 31, 32 and 33, etc. In this preferred embodiment these saw tooth wall members define a plurality of zigzag passages, for example, 34, 35 and 36. Initially, the members 31, 32 and 33 may be supported by the blade spacer bar 37a. Midway these members may be supported by spacer clips or pins 38a and the rear portions of these members may be supported by the blade spacer bar 39a. As noted from the drawing, blade spacer bar 37a has a slot 46 in which the leading bend portions 40 of the saw tooth members are inserted and supported.

Each of the saw tooth members 31, 32, etc. are comprised of a first wall member 41a with the adjacent parallel wall member being 41b (which is adjacent to 41c, etc.), the second wall members being located downstream are identified as 42a, b, etc. Naturally, when a large number of saw tooth members are utilized further letters of the alphabet will be utilized to define adjacent similar members.

Downstream from the second wall members are third wall members 43a and b and fourth wall members 44a and b. The fifth wall member is 45a which is located adjacent and parallel to 45b. The exit projection of the zigzag members constitutes bend portions 47 which extend in slots 48 provided in blade spacer bar 39a by which means the saw tooth members are spaced and supported. Considering that adjacent structures are merely duplications of the first saw tooth member only one passage will be described to define parallel zigzag passages. First wall members 41a and b define the first leg 50 of the zigzag passage 34. The second leg 51 is defined by second wall members 42a and b. The third leg 52 is defined by third wall members 43a and b.

Fourth leg 53 is defined by fourth wall members 44a and b and fifth leg 54 is defined by wall members 45a and b.

As combined gas and liquid stream enters the eliminator structure it encounters the first impingement surface 60 of first wall member 41a. This impingement surface 60 comprises a first planar surface 61 which is separated from second planar surface 62 by means of the vertically extending groove 63. With reference to both FIGS. 2 and 4, groove 63 comprises a vertically extending offset portion 64 which is angularly offset from the first planar surface. This offset 64 continues into the first transition surface 65 which in this embodiment is substantially parallel to the first planar surface. The first transition surface 65 terminates in an internal arcuate surface 66 which is vertically disposed and extends a full 180°. In this preferred embodiment other types of bends can be used as will be evident from the following description of the invention. The arcuate surface continues into the second transition surface 67 which is also parallel to the first planar surface 61 and terminates with a sharp bend and with the beginning of the second planar surface 62 which is in the same plane substantially as the first planar surface 61. This second planar surface extends for a predetermined length which will be described hereinafter.

The first leg 50 terminates at the end of surface 62 and the second leg 51 of the zigzag path is then encountered by the airstream. Because of the bend, a second impingement surface 70 is provided upon which the liquid in the air or gas stream will impinge. Toward the end of the impingement surface a pair of grooves 68 and 69 may be provided to collect a film and/or small particles of liquid still remaining in the gas stream.

Figure 5:
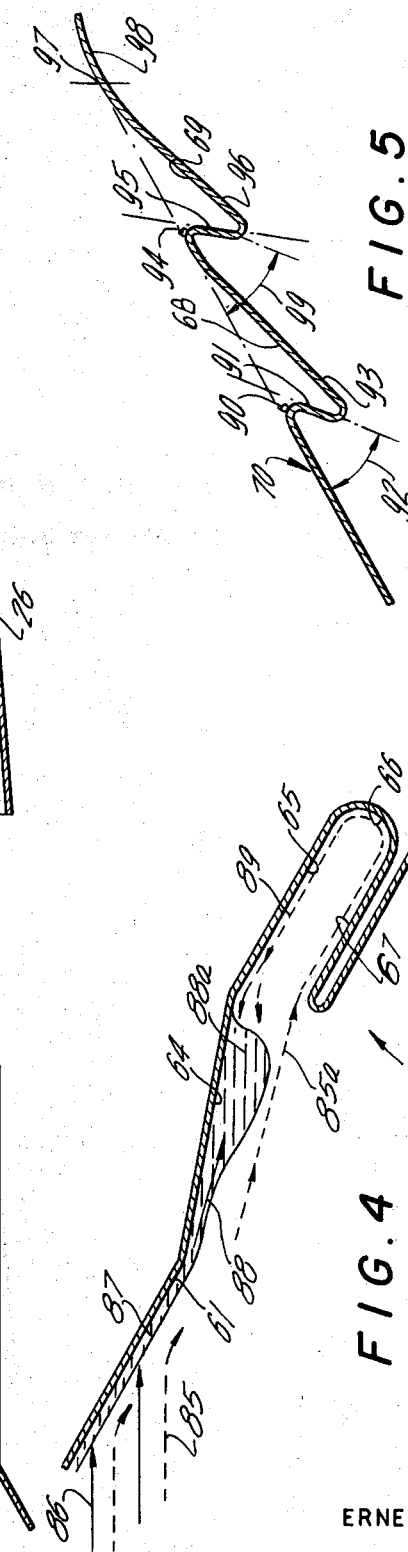
FIG. 5 is an enlarged fragmentary view of the portion of the eliminator structure showing the second set of grooves in FIG. 2.

FIG. 5 is an enlarged view of the grooves 68 and 69. As can be seen, surface 70 terminates at point 90 where groove 68 begins. A straight portion 91 is formed which makes an acute angle 92 with surface 70. Preferably the angle is less than approximately 90°. Thereafter, groove 68 is defined by curved section 93 which terminates at point 94 which is further noted to be in the plane of surface 70. Also at point 94 groove 69 begins with a straight surface 95 similar to surface 91. In this case angle 99 is also acute and should be 90° or less. Groove 69 is then further formed by curved surface 96 which extends to point 97 also in the plane of surface 70.

Thereafter the zigzag path bends into the third leg 52 wherein the third impingement surface 71 is encountered. Toward the downstream end of the third impingement surface 71 may be located an offset portion 72 which is provided for the purpose of supplying a groove and a smooth transition to the fourth and fifth legs of the zigzag path. These legs require the offset because wall members 44a and b and 45a and b are covered with a porous and resilient material such as urethane foam. In this embodiment the urethane foam 73 is approximately ⅛ inch thick and spaced in said foam are suitable grooves 74. These grooves are vertically disposed and the function of the foam and grooves will be more fully described hereinafter.

Considering now FIG. 3 there are shown blade spacer bars 37a and b which support the leading edges of the saw tooth members. Intermediate the ends of the eliminator are shown the spacer clips 38a and b which support the saw tooth member at the upper and lower portions thereof. Similarly, at the exit portions of the saw tooth members are shown the spacer bars 39a and b.

Another aspect of the invention is a deflector member 80 which in this embodiment is bolted or otherwise suitably attached to the spacer bar 37a so that a portion of the air stream into the eliminator is obstructed. This is provided for a purpose to be more fully described hereinafter. It is noted that the deflector member 80 has an arcuate form terminating adjacent the lower portion of the air washer. However, it is noted that a discrete space 81 is provided between the bottom of the air washer and the bottom portion of the deflector member. This space 81 is shown above the sump 30 and as a consequence the bottom of the blades 31, 32, 33, etc. are noted as not being submerged in liquid from the sump.

Toward the rear portion of the eliminator structure and mounted along the bottom sloped surface 84 of the passage is a suitable urethane foam block 83. This block is also formed of a porous and resilient material and it is intended that this block be in sealing engagement with the adjacent saw tooth members as well as bottom wall 84 of the passage.

Considering now the operation of the air washer described above, the gas, which in the case of an air washer is air, is drawn into the mixing chamber 5 whereupon it is propelled by the fan 6 toward the filter 13. In the case of an air washer as used in a textile mill, lint particles and other solids will be suitably removed so that the air stream leaving the filter will be relatively clean. Thereupon the air stream will encounter the spray nozzles 25. These spray nozzles pass the spray liquid into the gas stream and in the case of an air washer water of a predetermined temperature may be passed into the air stream. As a consequence, the air will not only if desired be placed in heat exchange relation with the liquid but also the moisture content of the air stream may be affected. Because of the high velocity of the gas stream, which in this case may have a velocity of 3400 feet per minute, it is quite possible that particles of the sprayed liquid may be entrained in the gas stream.

Reference is now made to FIGS. 2, 3, 4 and 5 of the application which are directed to the details of the eliminator structure. Initially, the air stream will encounter the first impingement surface 60 of the eliminator construction which it is noted is oriented substantially at 45° with respect to the direction of gas flow. For the sake of convenience since the eliminator comprises a plurality of parallel paths similar to zigzag passage 34 only the operation of a single passage will be discussed. The gas stream in the case of an air washer comprises an air stream 85 (see FIG. 4) and entrained liquid particle stream 86. The liquid particles upon impingement on the first planar surface 61 may form a film of water approximately 1/8 of an inch thick. The air stream will be deflected by this first planar surface with both air and liquid streams flowing along the first planar surface with the water of the liquid stream forming a film. These streams then encounter the opening in the groove 63 and the liquid film will pass along the offset portion 64 which is shown by arrow 88 in FIG. 4. Simultaneously, the air stream 85 will follow the arrow 85a which is indicated as not closely following the contour of the groove 63 but rather this air stream flows adjacent and nearly parallel to the second transition surface 67. Thereafter deflecting surface means are provided in the form of the bent or arcuate wall 66 which may provide a complete 180° turn. It is emphasized that this bend need not necessarily be circular. At this point the air stream has been deflected so that its direction has been substantially reversed. The air stream now follows adjacent the first transition surface 65 which is substantially parallel the second transition surface 67. In the area adjacent the offset surface 64 the directional components of the previously described liquid film and the air stream are in substantially confronting relationship. As a consequence, in the area adjacent the offset surface these two directional components substantially nullify each other because of the geometry of the groove which has been preselected. At this point by design the directional components of the air and liquid streams have been nullified and only the force of gravity is intended to act on the liquid stream permitting liquid to flow downwardly due to gravitational forces to be drained from the groove at the lower portion thereof (as shown at 88a).

In its broadest aspects the present invention recognizes that as high velocities are generated in an eliminating structure it is necessary to nullify and/or isolate various forces which may harmfully affect the collection and drainage of liquid. In this particular invention there is provided a groove and this groove includes an offset or collecting area in additon to a fluid stream reversal or deflecting means. It will be appreciated that it is intended within the spirit of this invention to utilize the fluid stream reversal means to act upon either or both of the fluid streams. That is, the direction of both the liquid and the gas stream may be altered in a manner so that their directional components when they confront each other will substantially nullify each other in substantially a horizontal plane. In this preferred embodiment it is noted that the direction of the air stream is the fluid stream whose direction has been altered to provide the desired confronting arrangement. It will be appreciated that within the spirit of this invention that either stream (liquid or gas) or both streams could be deflected to provide a situation wherein the fluid streams confront each other and substantially nullify their horizontal directional flow characteristics.

It has been found that this groove design is capable of removing 95% of the liquid entrained in the gas stream. Another aspect of the invention is that the second planar surfaces have a sufficient downstream length before a change of direction in the passage 34 is encountered. As noted above, passage 34 includes the first leg 50 and the second leg 51. It will be appreciated that with a high velocity gas stream it is quite possible to generate the low pressure immediately behind the second planar member 62 by the change in direction of the gas stream. If the second planar member 62 is not of sufficient length this so generated low pressure area will be in close enough proximity to groove 63 as to be capable of disturbing the dynamic yet balanced condition which insures liquid removal as described above.

The air stream as it enters the second leg 51 thereupon encounters the second impingement surface 70 whereon the particles may collect and even a small film may form. It has been found that this small film can be substantially removed by the first and second grooves 68 and 69. These grooves have their above described geometry wherein the grooves drain effectively because the coplanar aspects of surface 70 and points 90, 94 and 97 assure that no low pressure areas will cause flow out of these grooves back into the gas stream.

Thereafter the gas stream may encounter the third leg 52 whereon the third impingement surface 71 may be encountered. Toward the end of this leg 52 this impingement surface may have an offset 75 which not only acts in the manner of the grooves 68 and 69 but also there is provided sufficient displacement to permit a smooth transition along the passage walls for the legs 53 and 54 of the zigzag passage 34. The walls of the legs 53 and 54 in this embodiment are provided with a urethane foam 76 having located therein as noted above spaced vertical grooves 77. The urethane foam has resilient quality in addition to being an open cell construction which is also porous. At this point in the eliminator the air stream has lost between 95 and 99% of its entrained liquid content (in the form of droplets). The remaining droplets when they impinge on the urethane foam will not splatter because of the resilient nature of the impingement surface. In addition, the open cell and porous quality of the surface is such that upon impingement the liquid droplets will penetrate and be substantially removed from the air stream. Because two impingement surfaces are encountered in this portion of the zigzag path substantially all of the liquid in the form of droplets has been removed from the air stream passing through the eliminator. If necessary in certain particular applications additional coated members may be provided within the spirit of this invention.

FIG. 3 shows that when the droplets which have been removed from the air stream are collected on the eliminator surfaces by the action of gravity this liquid will pass downwardly toward the inclined wall 84. Initially, because of the deflector member 80 the air stream will be restricted at the lower portion of the eliminator and as a consequence the lower portion of the zigzag members as well as the lower inclined wall 84 are not subjected to the high velocity of the air stream which passes along the upper portions of each of the parallel zigzag passages. As a consequence, the liquid as it drains downwardly along the eliminator surfaces as it approaches the bottom of each saw tooth member will be less affected by the air stream. This facilitates drainage along surface 84. This also permits the flow of liquid in counter flow direction to the air stream down the surface 84 passing under the deflector member 80 through the space 81 into the sump of the air washer where it may be drained along the bottom wall 30 through the draining line 27 (FIG. 1).

To aid this drainage along the wall 84 and also to control the air flow in the exit portion of the eliminator passages there is mounted in sealing engagement with the bottom wall 84 and portions of the adjacent wall members of the saw tooth wall members a urethane block 83 which in this embodiment has a confronting surface 86 angularly disposed with respect to the air stream. The sealing engagement of this urethane block which is porous and resilient assures no air flow except in the upper portions of the defined zigzag paths. However, the liquid which is entrained in the legs 53 and 54 may pass downwardly through the foam coating on these legs and ultimately may drain through the porous block 83 along the surface 84 to join liquid collected in the initial legs of the eliminator passages.

While I have described a preferred embodiment of my invention it will be understood that the invention is not limited thereto since it may be otherwise embodied within the scope of the appended claims.

What is claimed as new and desired to be secured by Letters Patent of the United States is:

1. In an eliminator for removing particles of liquid from a high velocity gas stream the combination of means defining a passage for said gas stream, a plurality of wall members upon which the gas stream containing liquid particles is to impinge being located in said passage, at least one of said wall members comprising:
   (a) a first planar surface which deflects the gas stream and upon which the liquid particles impinge and form a liquid stream;
   (b) a second planar surface being located downstream from the first planar surface and being substantially in the same plane as the first planar surface;
   (c) means defining a substantially vertical groove;
   (d) the trailing edge of the first planar surface and the leading edge of the second planar surface defining the edges of said substantially vertical groove, the distance between the edges corresponding substantially to the extent of a liquid deflecting means whereby a portion of the gas enters the groove;
   (e) said groove including said liquid deflecting means extending from the trailing edge of the first planar surface for receiving the liquid stream which flows on the first planar surface; and
   (f) gas deflecting means for deflecting the portion of the gas stream which enters the groove, said gas deflecting means extending 180° from the leading edge of the second planar member and terminating at the end of said liquid deflecting means remote from the trailing edge of the first planar surface, the direction of the gas stream and the direction of the liquid stream in said groove being arranged by the gas and liquid deflecting means whereby the gas and liquid streams are substantially in confronting arrangement so that the flow components of the gas and liquid streams are substantially nullified permitting the liquid to flow in a substantially vertical direction in said groove.

2. The eliminator according to claim 1, wherein the gas deflecting means comprises an arcuate wall which extends 180° and reverses the direction of the gas stream.

3. The eliminator according to claim 1 wherein said liquid deflecting means comprises an offset planar portion located adjacent the trailing edge of the first planar surface, and being angularly disposed with respect to said first planar surface, liquid flowing in a general horizontal direction from the first planar surface onto the offset planar portion, said gas deflecting means comprising a first transition surface connected to the offset planar portion, a vertically disposed bent wall, said bent wall being continuous with said first transition surface, a second transition surface being continuous with said bent wall and adjacent to and parallel to the second planar surface, the gas stream flowing in a general horizontal direction into said groove being deflected by the bent wall so as to directionally confront the liquid stream on the offset planar portion, the direction components of the liquid stream and the gas stream substantially nullifying each other to permit gravitational flow of the liquid along the offset portion.

4. The eliminator according to claim 3, wherein the bent wall is arcuate and extends 180°.

5. The eliminator according to claim 3, wherein the second planar surface has a length sufficient so that the pressure along said surface is maintained at a sufficient level so as to avoid external pressure effects on the fluid in the groove, said second surface extending downstream substantially beyond the deepest portions of said groove.

6. The eliminator according to claim 5, further comprising a plurality of parallel substantially vertically disposed members having walls which define a plurality of zigzag passages, said first and second planar surfaces with the vertical groove comprising one of said vertically disposed members which is angularly disposed with respect to the gas and liquid flow entering the eliminator and being a portion of one of said zigzag passages, said zigzag passage further comprising a pair of walls defining the second leg in the passage, said leg including a second impingement surface having at least one vertical groove therein which is formed by a straight portion which is at an acute angle with the wall and a second portion which forms an angle with the straight portion so as to extend and substantially terminate at the planar projection of the wall.

7. The eliminator according to claim 6, wherein said passage has a third leg with another impingement wall having at least one vertical groove, a fourth leg in said passage, the walls downstream and adjacent said fourth leg having a coating of porous and resilient material, and the coating is interrupted by a plurality of spaced vertical grooves.

8. The eliminator according to claim 6, wherein the bottom wall of said zigzag passages sloped downwardly in a direction opposite that of gas flow through said passages.

9. The eliminator according to claim 8, wherein a plurality of porous members are spaced in abutting arrangement with the sloped wall and the members defining the zigzag paths through the eliminator so as to partially obstruct gas flow through said eliminator while permitting counterflow drainage of liquid down the sloped wall through the porous members.

10. The eliminator according to claim 8, wherein a deflecting member is mounted upstream from the zigzag passages, said deflecting member partially obstructing air passing to said eliminator zigzag paths, said deflector being spaced above the lowermost portion of the passage to permit counterflow passage of liquid along the sloped bottom surface from the eliminator structure.

11. An open ended housing having a top wall, a bottom wall and side walls, a plurality of spaced substantially vertical wall members extending from said top wall to said bottom wall and defining a plurality of substantially parallel zigzag paths, said top and bottom walls defining an inlet and an outlet so that liquid particles in a gas stream passing from the inlet to the outlet impinge on the wall members and drain down said wall members, said bottom wall being sloped downwardly towards said inlet from said outlet, and baffle means upstream from the the zigzag passages and adjacent the bottom wall at said inlet to diminish the influence of the gas stream on the draining liquid.

12. The eliminator according to claim 11 wherein a porous member engages the lower portions of the wall members defining at least one of the zigzag passages and also engaging the bottom member so that liquid draining from the wall members flows down the sloped bottom wall member through the porous member.

References Cited

UNITED STATES PATENTS

| | | | |
|---|---|---|---|
| 2,812,167 | 11/1957 | Wroth | 55—257 |
| 3,304,696 | 2/1967 | McKenna | 55—440 |
| 3,338,035 | 8/1967 | Dinkelacker | 55—440 |
| 1,928,706 | 10/1933 | Sillers | 55—440 |

FOREIGN PATENTS 107,134  8/1927  Austria.

OTHER REFERENCES

German printed application No. 1,046,576, Dec. 18, 1958 (Karl Weiss).

FRANK W. LUTTER, Primary Examiner

B. NOZICK, Assistant Examiner